: US006763172B2

United States Patent
Sahlin et al.

(10) Patent No.: US 6,763,172 B2
(45) Date of Patent: Jul. 13, 2004

(54) SUPPORT CLIP FOR USE WITH LIGHT FIBER

(75) Inventors: Jennifer J. Sahlin, Minneapolis, MN (US); Robert M. Biegler, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/147,159

(22) Filed: May 16, 2002

(65) Prior Publication Data

US 2003/0215205 A1 Nov. 20, 2003

(51) Int. Cl.[7] ............................................... G02B 6/00
(52) U.S. Cl. ........................................................ 385/137
(58) Field of Search ................................ 385/134, 136, 385/137, 147; 248/59, 62, 74.1, 74.3, 80, 81, 73, 74.5; 439/446, 447, 463, 471, 435, 464

(56) References Cited

U.S. PATENT DOCUMENTS

| | | | |
|---|---|---|---|
| 1,924,353 A | | 8/1933 | Fitzpatrick |
| 3,807,675 A | * | 4/1974 | Seckerson et al. ............ 248/73 |
| 3,905,570 A | * | 9/1975 | Nieuwveld .................... 248/71 |
| 4,306,696 A | | 12/1981 | Pondman |
| 4,342,438 A | * | 8/1982 | Speedie ....................... 248/73 |
| 4,371,137 A | * | 2/1983 | Anscher ...................... 248/73 |
| 5,235,731 A | * | 8/1993 | Anzai et al. ............... 24/590.1 |
| 5,368,261 A | * | 11/1994 | Caveney et al. .............. 248/73 |
| 5,432,876 A | | 7/1995 | Appledorn et al. ........... 385/31 |
| 5,659,643 A | | 8/1997 | Appledorn et al. ........... 385/21 |
| 5,799,906 A | * | 9/1998 | Hillegonds ................... 248/49 |
| 5,803,413 A | * | 9/1998 | Benoit et al. ................ 248/73 |
| 5,845,038 A | | 12/1998 | Lundin et al. ................ 385/90 |
| 5,906,342 A | * | 5/1999 | Kraus ....................... 248/74.1 |
| 6,257,530 B1 | | 7/2001 | Tsai |

| | | |
|---|---|---|
| 2002/0011548 A1 | 1/2002 | Parker |

FOREIGN PATENT DOCUMENTS

| | | |
|---|---|---|
| EP | 0 377 236 | 11/1989 |
| FR | 1454892 | 10/1966 |
| GB | 2 001 694 | * 2/1979 |
| GB | 2 062 803 | * 5/1981 |
| GB | 2200401 | 8/1988 |
| WO | WO 00/25159 | 5/2000 |
| WO | WO 01/28780 | 8/2001 |
| WO | WO 01/58302 | 8/2001 |

OTHER PUBLICATIONS

U.S. patent application Ser. No. 09/969,272, Sahlin et al., filed Oct. 1, 2001.
Sales Literature—Lumenyte International Corporation, 350 Lear Avenue, Costa Mesa, CA 92626, "U" Channel & Snap–On, "U" Channel Cap Optic Fastener, Lit # CL027, Rev. 1 1/96 "Stand–Off Track, Linear Optic, and Mounting System," Lit # CL028, Rev. 1 1/96 "Neon Stand–Off Clip, Optic Fastener," Lit # CL022 Rev. 1 1/96 "Optic Clip, Clear Fastener," Lit # CL029 Rev. 1 1/96.
Sales Literature—LBM, Seitenlicht (German), Translation enclosed, no date.
Visual Lighting Technologies, 23352 Madero Road, Unit J, Mission Viejo, CA 92691. "Ultratec Series Mounting Accessories" "Flex Light[SM] Series Mounting Accessories", no date.

* cited by examiner

Primary Examiner—Khiem Nguyen
(74) Attorney, Agent, or Firm—Stephen W. Buckingham

(57) ABSTRACT

An offset clip for use with light fiber has a base including a hole for accommodating a fastener. The clip also includes an insert with a light fiber retaining member. The light fiber retaining member may take any of several forms and may be either rigid or flexible. The insert and the base are held rotatably together by a locking mechanism. The insert and the base are arranged such that when the insert is inserted into the base, the insert hides the fastener from view.

21 Claims, 6 Drawing Sheets

SUPPORT CLIP FOR USE WITH LIGHT FIBER

FIELD OF THE INVENTION

The present invention relates to large core plastic optical fiber and more particularly to offset clips for mounting and supporting such fiber.

BACKGROUND

Large core plastic optical fiber, often known as light fiber, is a product used in lighting applications. Light fiber is known as large core because it has a very large diameter compared to conventional optical fibers used for communications. Light fibers generally range from about 5 mm to about 18 mm in diameter. Bundles of smaller fibers are sometimes used instead of a single large fiber. Such bundles provide lower packing densities and result in greater insertion loss than single large fibers. Furthermore, extraction from bundled fibers is less efficient than from single large fibers. Therefore, single large fibers are generally preferred for lighting applications.

Light fiber has many uses both in decorative and functional lighting. Light fiber is generally broken into two categories known as end-light and side-light. End-light fibers are optimized for the efficient transportation of light with low absorption and low loss so that almost all of the light inserted into the fiber at one end emerges at or near the other end of the fiber. Side-light fiber, on the other hand, is optimized to emit light laterally along the entire length of the fiber. Preferably, side-light fiber will provide substantially uniform emission over the length of the fiber. For these purposes, generally uniform means uniform in appearance to the human eye. Over relatively long expanses, for example 20 meters or more, an intensity ratio of three to one from one end to the other will appear uniform to most people, as long as there are no abrupt changes in intensity. In addition, it is possible to combine end-light and side-light fibers so that an end-light fiber emits light from its end into a side-light fiber which then provides uniform emission over a distance. Such an arrangement makes it possible to separate the actual light source from the area to be illuminated.

There are many reasons why light fiber is advantageous over conventional lighting systems. For example, it may be used in remote source lighting. In remote source lighting the actual area to be lit is physically separated from the light source. This is useful for refrigerated areas because the heat emitting light source does not need to be located inside the refrigerated area. Remote source lighting is also useful in areas where explosion is a risk because the electrical components and heat emitting components are located outside of the hazardous area. Remote source lighting is advantageous in underwater lighting as well because the electrical components may be isolated from the water. Remote source lighting is also useful for lighting areas that are difficult to reach. The light source may be placed in a convenient location to simplify maintenance, while the fiber delivers light to the more difficult to reach location.

Side-light fibers also provide advantageous replacement of other types of conventional lighting. For example, side-light fiber may be used as a much more durable replacement for neon lights. Besides not being subject to breakage like neon lights, light fiber avoids the expense of custom glass bending and glass blowing associated with neon light fixtures. Furthermore, light fiber may be used to provide lighting effects unobtainable with neon. For example color wheels may be used to provide light fixtures having neon-like appearance while providing changing colors. By using two color wheels inserting different colors at each end of a light fiber a variety of effects may be achieved by the color mixing from the two light sources.

A variety of techniques may be used to manipulate the light distributed from light fiber. These are generally known as extraction techniques. U.S. Pat. Nos. 5,432,876, 5,659,643 and 5,845,038, the teachings of which are incorporated herein by reference, teach notching the fiber so that light is extracted from the fiber by total internal reflection from the notches. Published PCT application WO 00/25159 teaches the incorporation of various reflective materials, such as titanium dioxide, into the fiber clad in order to enhance both the extraction and the uniformity of the light emission. A light fiber according to this application is sold by 3M Company under the name HL Fiber.

Because of its flexible nature, it is necessary to support light fiber for viewing. A common way of doing so is to clamp the light fiber in a channel. Commonly assigned, copending U.S. patent application 09/969,272, the teaching of which is incorporated herein by reference, teaches a channel for supporting light fiber.

Channels are primarily useful if substantial lengths of the light fiber are to be displayed in straight lines. If the light fiber is to be displayed in a curved configuration, smaller offset clips are typically used to support it. Offset clips are particularly useful when the light fiber is used for neon replacement. Commonly used offset clips are very similar to the ones used to support neon light fixtures. Such offset clips are generally made of transparent, rigid plastic and formed in three parts. One part is a base or foot that accommodates a screw or other mechanical fastener for attaching the base to a wall or other surface. The second part, offset from the screw, is a post. A third part, with curved portion on the top forms a bracket that accommodates the neon tube or light fiber and clamps it into place. The two latter parts snap together and are biased apart by a spring. The spring provides resiliency that helps to protect a fragile neon tube. A problem with such brackets is that, in order to hold the light fiber in place, these brackets tend to pinch the fiber quite tightly. This can compress the fiber slightly causing undesirable extraction effects. This extraction can cause bright spots or other nonuniformities in the light output. Furthermore, the foot, although accommodating the fastener for attaching the offset clip to a wall, is unaesthetic in appearance.

SUMMARY OF THE INVENTION

According to the invention, an offset clip for use with light fiber has a base including a hole for accommodating a fastener. The clip also includes an insert with a light fiber retaining member. The light fiber retaining member may take any of several forms and may be either rigid or flexible. The insert and the base are held rotatably together by a locking mechanism. The insert and the base are arranged such that when the insert is inserted into the base, the insert hides the fastener from view

DETAILED DESCRIPTION

According to the invention, an offset clip is provided for mounting light fiber. The offset clip of the invention may be used with either end-light or side-light fiber, but is particularly useful with side-light fiber that is to be mounted in a curved configuration. A specific use to which the inventive offset clip may be put is to mount light fiber that is to be used to replace neon tubing.

Figure 1:
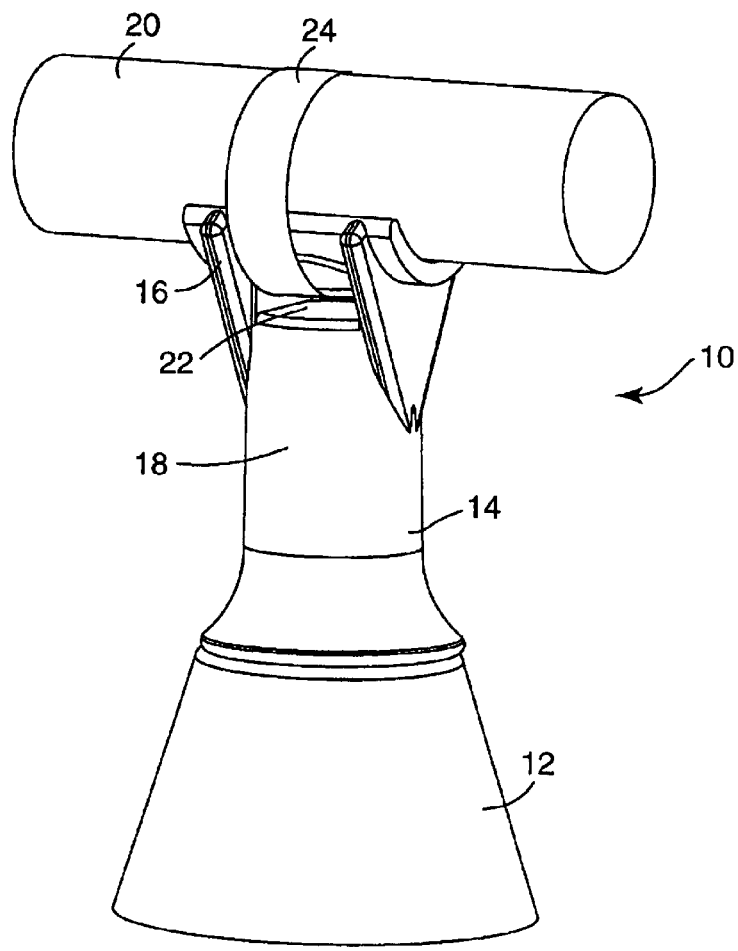
FIG. 1 is a perspective view of a first embodiment of an offset clip according to the invention.

FIG. 1 is a perspective view of an offset clip according to the present invention, designated generally as 10. As shown in FIG. 1, offset clip 10 includes a base 12, and an insert 14. Base 12 and insert 14 are snap-fit together. The embodiment of FIG. 1 includes a bracket 16 and a post 18. Post 18 provides an offset from a wall or other surface to which offset clip 10 is fastened. Post 18 can rotate in base 12. Bracket 16 is shaped to receive a light fiber 20. Insert 14 also includes a slot 22. Slot 22 accommodates a light fiber retaining member 24. Light fiber retaining member 24 may be any flexible, and preferably transparent, material. In general, such flexible members will not exert sufficient pressure on the fiber to cause undesirable light extraction.

A particularly desirable material for fiber retaining member 24 is described in published PCT application WO 01/58780, the teaching of which is incorporated herein by reference. According the teaching of that patent, a mechanical fastener can be used to repositionably contain the light fiber in bracket 16. The strap can have the structured surface fastening pattern along the entire length of the strap, or it can be smooth in the area which would circumscribe the fiber.

Figure 2:
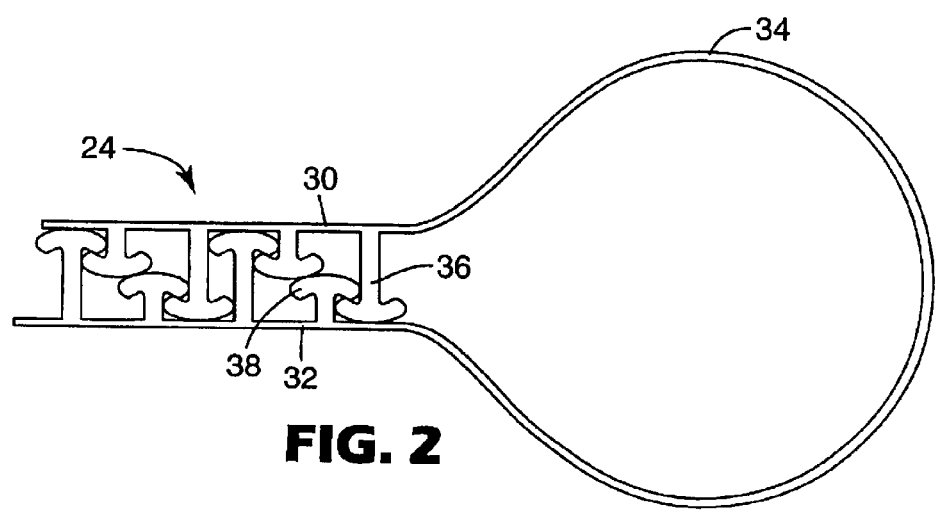
FIG. 2 is a side view of a fiber retaining member for use with the offset clip of FIG. 1.

An example of a fiber retaining member incorporating a structured surface fastener as taught in PCT application WO 01/58780 is shown in FIG. 2. According to FIG. 2, fiber retaining member 24 includes fastening elements 30 and 32 and a retaining loop 34. Fastening elements 30 and 32 include long ribs, such as rib 36, and short ribs, such as rib 38. In use, strap 34 is wrapped around a light fiber and fastening elements 30 and 32 are pressed together so that each long rib 36 of one fastening element engages with a short rib of the other. Alternatively, an adhesive backed tape such as VHB tape, available from 3M Company, may be used.

Figure 3:
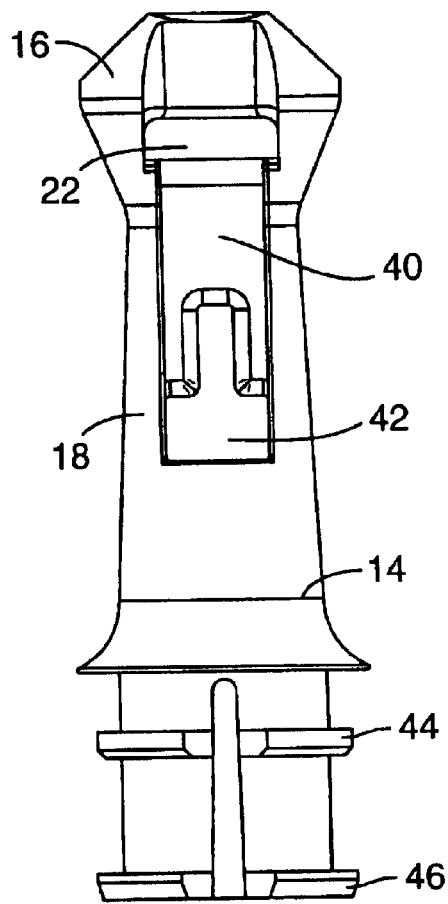
FIG. 3 is a side view of an insert according to the embodiment of FIG. 1.

FIG. 3 is a side view of insert 14 of FIG. 1. As shown in FIG. 3, insert 14 includes a recessed portion 40 on post 18 and a slot 42 at the bottom of recessed portion 40. The loose ends of fiber retaining member 24 are inserted into slot 42 and the portion extending from fiber 20 to the ends is pressed into recess 40. This helps to conceal the portions of fiber retaining member 24 that are not in contact with fiber 20 and improves the appearance of clip 10 when it is in use. This structure is particularly useful when fiber retaining member is a film with mechanical fasteners on it as shown in FIG. 2. The loose ends of fiber retaining member 24 may be held mechanically in slot 42 or may be held with an adhesive or by ultrasonic welding.

Figure 4:
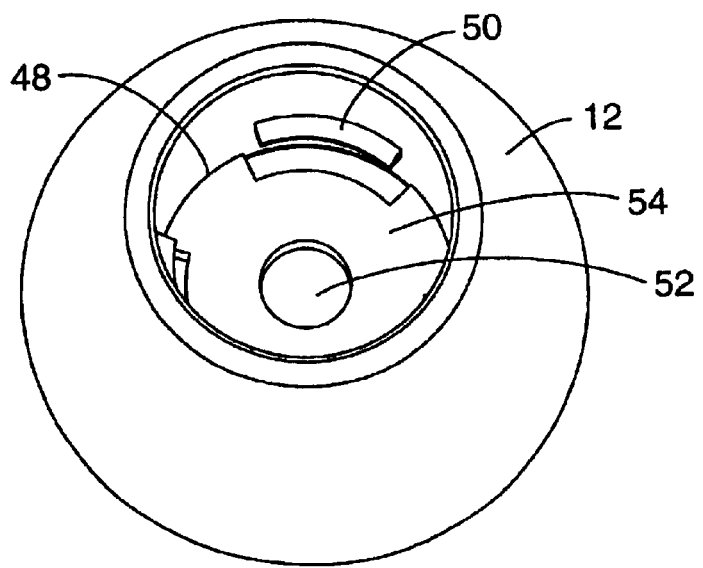
FIG. 4 is a perspective view of a base according to the embodiment of FIG. 1.

Insert 14 also includes flanges 44 and 46. Flange 44 primarily provides better alignment when insert 14 is inserted into base 12 of FIG. 1. Flange 46 provides a snap fit over protrusions provided for that purpose in base 12. Flange 46 and the cooperating protrusions inside base 12 form a locking mechanism for holding base 12 and insert 14 rotatably together. FIG. 4 is a perspective view of base 12. Base 12 includes an opening 48 into which insert 14 is slip-fit. Inside opening 48 are protrusions such as protrusion 50 for receiving flange 46 as described above. Also inside opening 48 is a hole 52 in the bottom 54 of base 12. Hole 52 is sized and positioned to accommodate a fastener such as a screw, nail, rivet, bolt, or other fastener that could be used to attach base 12 to a wall or other surface. When insert 14 is fit into opening 48, it hides the fastener providing a more desirable aesthetic appearance than the offset base of the prior art.

Figure 5:
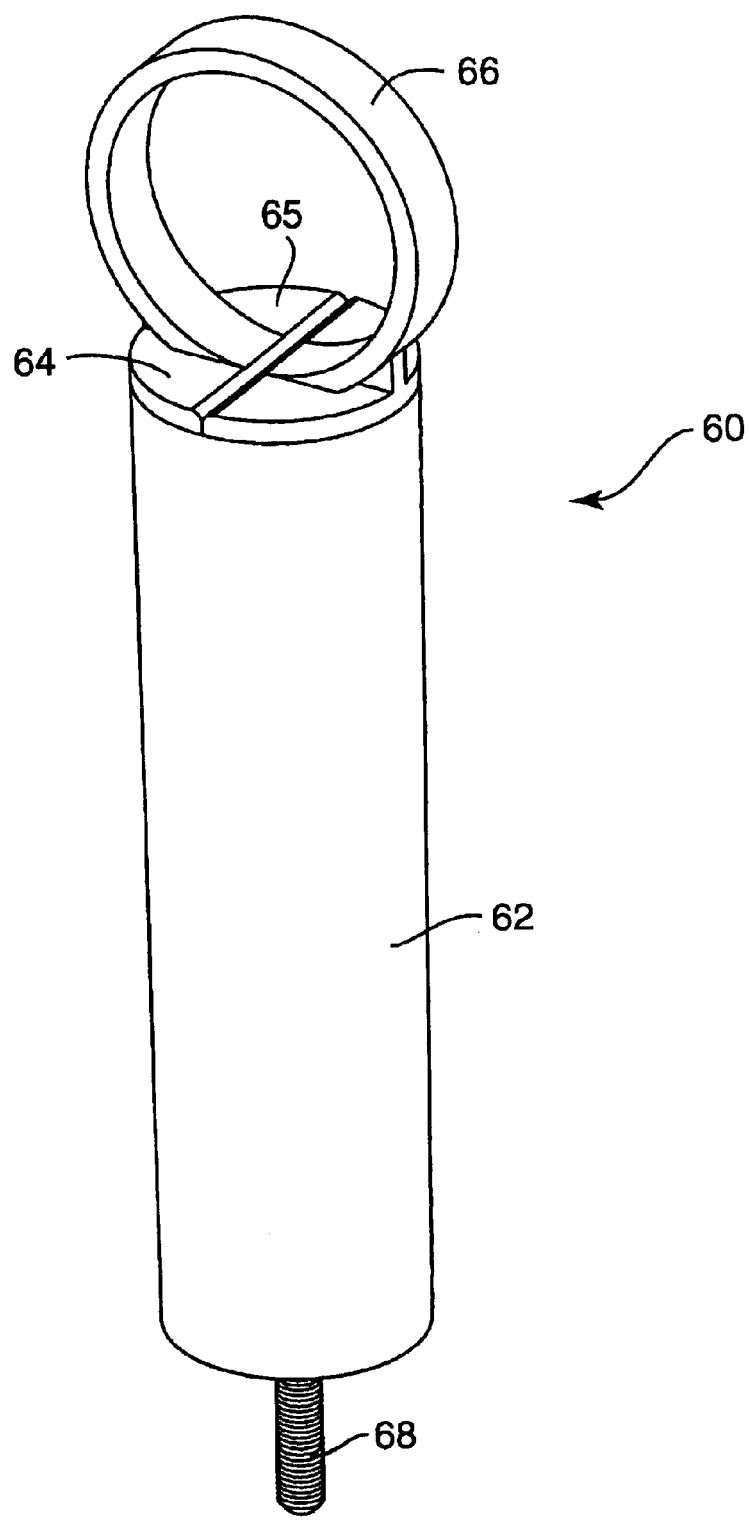
FIG. 5 is a perspective view of an offset clip according to another embodiment of the invention.

FIG. 5 is a view of another embodiment of the present invention. According to the embodiment of FIG. 5, offset clip 60 includes a base 62 and an insert 64. Base 62 is larger than base 12 of the embodiment of FIG. 1. In the embodiment of FIG. 5, base 62 provides nearly all of the height of offset clip 60. Insert 64 includes a light fiber retaining member 66 for holding the fiber in place. Light fiber retaining member 66 should generally be slightly larger than the fiber to be held. As shown, light fiber retaining member 66 is round because most light fiber is round. Generally, however, light fiber can have a cross section of any arbitrary shape. Examples of other shapes that are used are ellipses, square, star-shaped, and other polygons. Light fiber retaining member 66 should be of the same shape as the fiber to be held.

Insert 64 also includes a cap 65 that covers the top of base 62 when insert 64 is in place. This provides a more desirable appearance as well as protects the interior of base 62 from contaminants such as dirt or fluids.

FIG. 5 also shows a fastener 68. As described with respect to FIG. 4, fastener 68 could be a screw, nail, rivet, bolt, or other fastener that could be used to attach base 62 to a wall or other surface.

Figure 6:
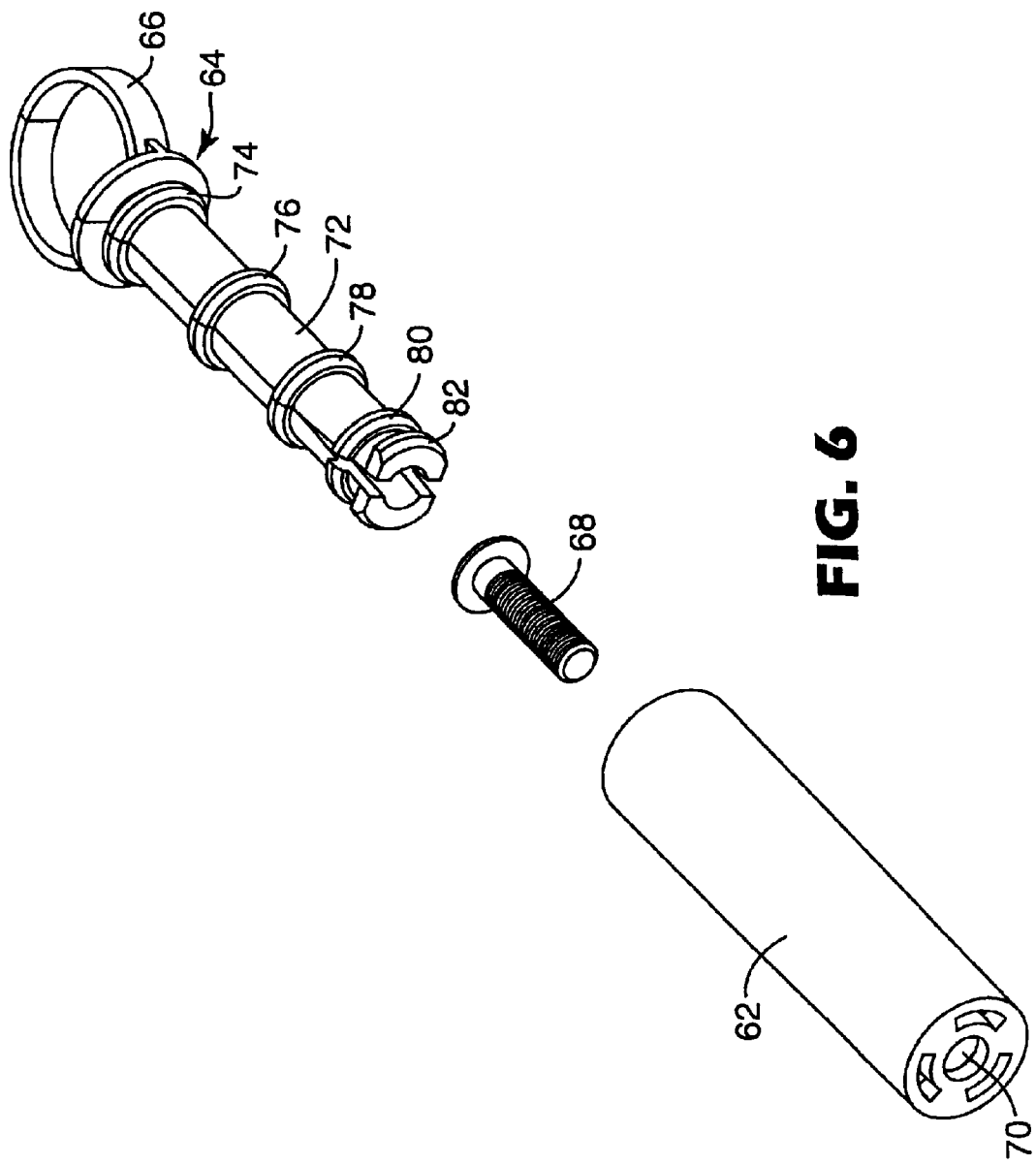
FIG. 6 is an exploded perspective view of the offset clip of FIG. 5.

FIG. 6 is an exploded view of the offset clip of FIG. 5. As may be seen, base 62 includes a hole 70 to accommodate fastener 68, similar to hole 52 in base 12 of FIG. 4. As with offset clip 10, when insert 64 is inserted into base 62, hole 70 and fastener 68 are hidden from view providing a more desirable aesthetic appearance.

Insert 64 includes a shaft 72. Shaft 72 includes flanges 74, 76, 78, 80, and 82. The exact number of such flanges is not critical to the invention. These flanges serve two purposes. First, any of these flanges could be used to retain insert 64 in base 62 when it is snap-fit in place. In a preferred embodiment, however, flanges 74, 76, 78, and 80 are used primarily to improve the alignment of insert 64 in base 62. Flanges 74, 76, 78 and 80 also act to prevent spreading of shaft 72 and thus increase the retention force of insert 64 in base 62. Flange 82 fits below protrusions, not shown, in the interior of base 62 similar protrusion 50 of base 12 of FIG. 4. This retains insert 64 in base 62 in use. Thus, the combination of flange 82 and the protrusions form a locking mechanism to hold base 62 and insert 64 rotatably together.

Offset clip 60 may be made tamper resistant by sizing flange 82 and the protrusions with which it connects such that, after insert 64 and 62 have been engaged by being snap-fit together, they cannot be disengaged without breaking offset clip 60. Thus the connection is made permanent. This provides two forms of tamper resistance. First, since fiber retaining member 66 completely circumscribes the light fiber to be held in place, the fiber may not be removed from offset clip 60 without removing insert 64 from base 62. This can only be done by breaking offset clip 60. Second, since insert 64 prevents access to fastener 68, offset clip 60 can only be removed from the wall or other supporting structure to which it is attached by breaking offset clip 60.

Figure 7:
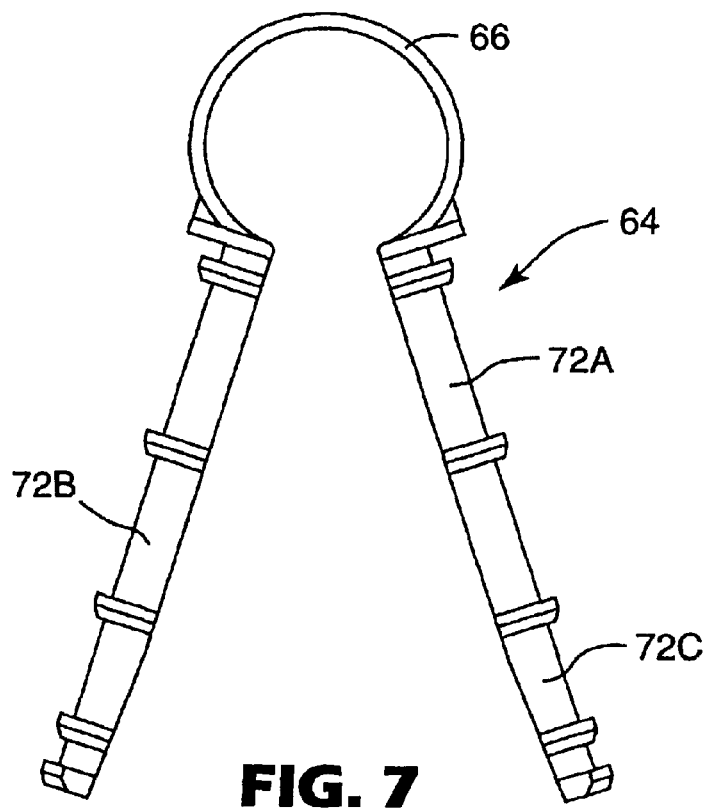
FIG. 7 is a side view of the insert according to the embodiment of FIG. 5.

FIG. 7 shows insert 64. As shown, shaft 72 includes two portions, 72A and 72B. Shaft portions 72A and 72B are connected by light fiber retaining member 66 that acts as a hinge. Shaft portions 72A and 72B may be separated in order to open light fiber retaining member 66 for insertion of a light fiber. Shaft portions 72A and 72B are then pressed together before insert 64 is snap-fit into base 62. Base 62 then holds shaft portions 72A and 72B in place to lock the fiber in light fiber retaining member 66. Fiber retaining member 66 should be sized slightly larger than the fiber to be held.

Figure 8:
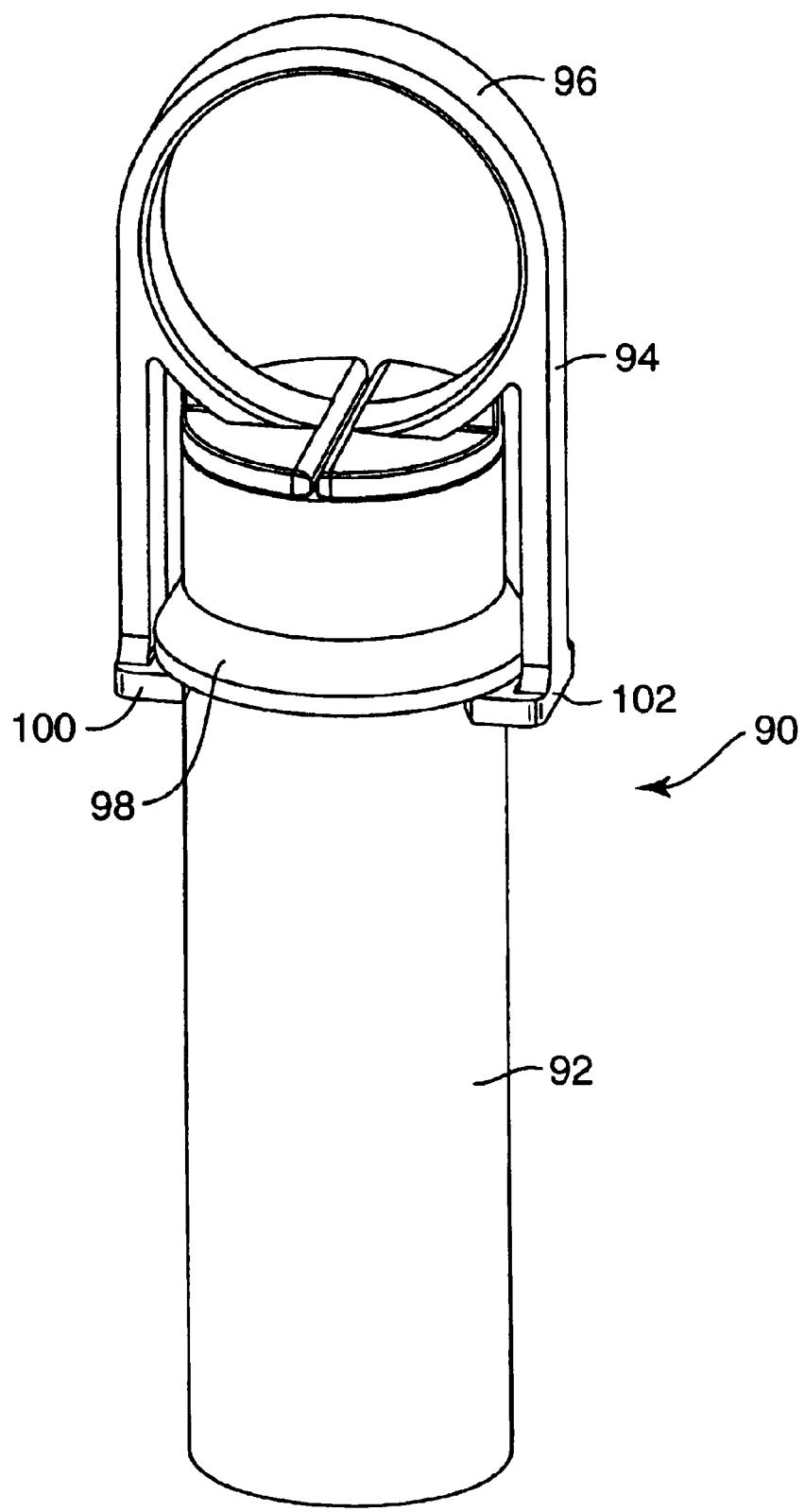
FIG. 8 is a perspective view of an offset clip according to another embodiment of the invention.

FIG. 8 shows another offset clip 90 according to the present invention. Offset clip 90 includes a base 92 and an insert 94. As in the embodiment of FIG. 5, base 92 provides most of the height of offset clip 90. Insert 94 includes a light fiber retaining member 96. As described previously, light fiber retaining member 96 is shown as circular in FIG. 8, but should be the same shape as the cross section of the fiber with which it is intended for use and slightly larger than that fiber. Base 92 includes a flange 98 for engaging with clips 100 and 102 of insert 94. Flange 98 and clips 100 and 102 form a locking mechanism for holding base 92 and insert 94 rotatably together.

As with the embodiments previously described, base 92 includes a hole for accommodating a fastener. Such fastener could be a nail, screw, bolt, rivet, or any other mechanical fastener for fastening offset clip 90 to a wall or other surface.

Figure 9:
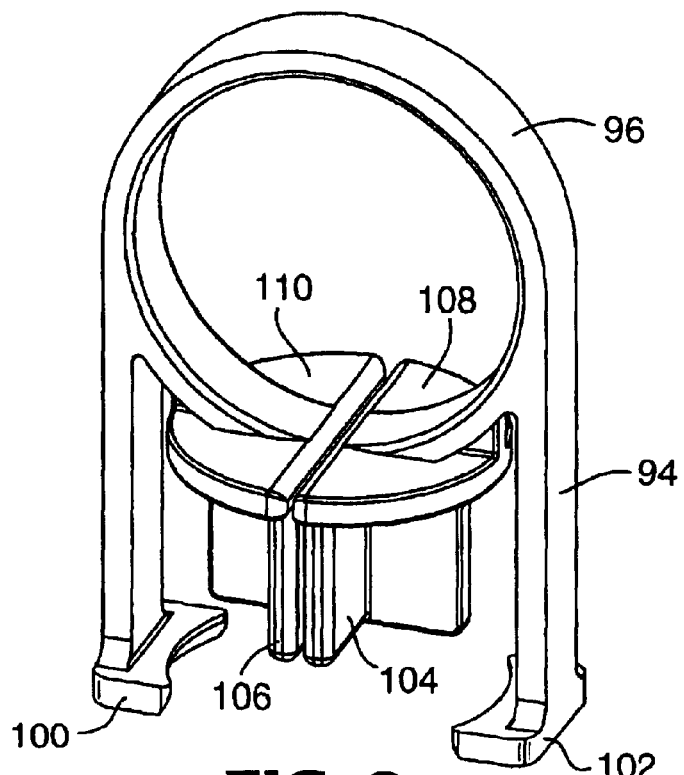
FIG. 9 is a perspective view of the insert according to the embodiment of FIG. 8.

FIG. 9 shows insert 94 of FIG. 8. In addition to light fiber retaining member 96 and clips 100 and 102, insert 94 also includes stabilizing members 104 and 106 and cap portions 108 and 110. Stabilizing members 104 and 106 fit inside base 92 in order to prevent insert 94 from rocking from side to side. Stabilizing members 104 and 106 also act to prevent spreading of clips 100 and 102 under a side loading of the fiber and thus prevent clips 100 and 102 from disengaging from flange 98. The length of stabilizing members 104 and 106 can vary as well. Cap portions 108 and 110 block the end of base 92 when insert 94 is inserted into base 92. This prevents dirt and other debris from entering base 92 and hides the fastener, providing a more pleasing aesthetic appearance.

All of the embodiments described above may be made of a variety of materials and by a variety of methods. For example, they could be machined metal parts. However, for economic reasons, injection molded plastics are particularly preferred. Among the materials that could be used are polycarbonate, polymethyl methacrylate (PMMA), polystyrene, styrene acryloylnitrile, clarified polypropylene, polysulfone, polyetherimide, (PEI), polyethylene terephthalate (PET) or copolymers of PET such as PETG. Depending on the application, these may be transparent, translucent, or opaque. If translucent or opaque, the color may be chosen to provide a desired aesthetic effect. In a preferred embodiment, the base is translucent or opaque while the insert and fiber retaining member are transparent. If a material to be used herein is to be rendered translucent or opaque, that may be done by adding a colorant to the resin or by providing it with a matte or other structured surface.

What is claimed is:

1. An offset clip for use with light fiber, said offset clip comprising:
   a base including a hole for accommodating a fastener; and
   an insert including a light fiber retaining member, said insert and said base held together by a locking mechanism, said locking mechanism including a flange on said insert and a protrusion for engaging said flange recessed inside said base, said insert and said base being arranged such that when said insert is inserted into said base, said insert hides said fastener from view.

2. An offset clip according to claim 1 wherein, after said flange and said protrusion have been engaged, they cannot be disengaged without breaking said offset clip.

3. An offset clip according to claim 1 wherein, after said flange and said protrusion have been engaged, a light fiber cannot be removed from said fiber retaining member without breaking said offset clip.

4. An offset clip according to claim 1 wherein said insert includes a cap that hides said fastener when said insert is inserted into said base.

5. An offset clip according to claim 1 wherein said insert includes a slot to hold loose ends of said fiber retaining member.

6. A light fiber system comprising:
   an offset clip including a base including a hole for accommodating a fastener and an insert including a light fiber retaining member, said insert and said base held together by a locking mechanism, said locking mechanism including a flange on said insert and a protrusion for engaging said flange recessed inside said base, said insert and said base being arranged such that when said insert is inserted into said base, said insert hides said fastener from view; and
   a light fiber in said light fiber retaining member.

7. An offset clip for use with light fiber, said offset clip comprising:
   a base including a hole for accommodating a fastener;
   an insert including a light fiber retaining means; and
   a locking means for holding said insert and said base together, said locking mechanism including a flange on said insert and a protrusion for engaging said flange recessed inside said base;
   wherein said insert and said base are arranged such that when said insert is inserted into said base, said insert hides said fastener from view.

8. An offset clip according to claim 7 wherein, after said flange and said protrusion have been engaged, they cannot be disengaged without breaking said offset clip.

9. An offset clip according to claim 7 wherein said insert includes a cap that hides said fastener when said insert is inserted into said base.

10. An offset clip for use with light fiber, said offset clip comprising:
    a base including a hole for accommodating a fastener; and
    an insert including a light fiber retaining member, said insert and said base held together by a locking mechanism, said locking mechanism including a flange on said base and a clip on said insert, said insert and said base being arranged such that when said insert is inserted into said base, said insert hides said fastener from view.

11. An offset clip according to claim 10 wherein said insert is rotatable in said base.

12. An offset clip according to claim 10 wherein said locking mechanism includes two clips on said insert.

13. An offset clip for use with light fiber, said offset clip comprising:
- a base including a hole for accommodating a fastener;
- an insert including a light fiber retaining means; and
- a locking means for holding said insert and said base together, said locking mechanism including a flange on said base and a clip on said insert;
- wherein said insert and said base are arranged such that when said insert is inserted into said base, said insert hides said fastener from view.

14. An offset clip according to claim 13 wherein said locking mechanism includes two clips on said insert.

15. An offset clip according to claim 13 wherein said insert is rotatable in said base.

16. A light fiber system comprising:
- an offset clip including a base including a hole for accommodating a fastener and an insert including a light fiber retaining member, said insert and said base held together by a locking mechanism, said locking mechanism including a flange on said base and a clip on said insert, said insert and said base being arranged such that when said insert is inserted into said base, said insert hides said fastener from view; and
- a light fiber in said light fiber retaining member.

17. An offset clip according to claim 16 wherein said insert is rotatable in said base.

18. An offset clip according to claim 1 wherein said insert is rotatable in said base.

19. An offset clip according to claim 6 wherein, after said flange and said protrusion have been engaged, a light fiber cannot be removed from said fiber retaining member without breaking said offset clip.

20. An offset clip according to claim 7 wherein said insert is rotatable in said base.

21. An offset clip according to claim 7 wherein, after said flange and said protrusion have been engaged, a light fiber cannot be removed from said fiber retaining member without breaking said offset clip.

* * * * *